US009763039B2

(12) United States Patent
Kahn et al.

(10) Patent No.: US 9,763,039 B2
(45) Date of Patent: Sep. 12, 2017

(54) CONTROLLING ACCESS TO VENUE-RELATED CONTENT, APPLICATIONS, AND SERVICES

(71) Applicants: Colin L. Kahn, Morris Plains, NJ (US); Christopher A. White, Neshanic Station, NJ (US)

(72) Inventors: Colin L. Kahn, Morris Plains, NJ (US); Christopher A. White, Neshanic Station, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/585,470

(22) Filed: Dec. 30, 2014

(65) Prior Publication Data

US 2016/0192130 A1 Jun. 30, 2016

(51) Int. Cl.
*G06F 7/04* (2006.01)
*G06F 17/30* (2006.01)
*H04N 7/16* (2011.01)
*H04W 24/00* (2009.01)
*H04W 4/02* (2009.01)
*H04W 12/04* (2009.01)
*H04W 12/06* (2009.01)
*H04W 12/08* (2009.01)

(52) U.S. Cl.
CPC ......... *H04W 4/021* (2013.01); *H04W 12/04* (2013.01); *H04L 2463/061* (2013.01); *H04W 12/06* (2013.01); *H04W 12/08* (2013.01)

(58) Field of Classification Search
None
See application file for complete search history.

(56) References Cited

U.S. PATENT DOCUMENTS

| 8,886,584 | B1 | 11/2014 | Kane, Jr. | |
|---|---|---|---|---|
| 2005/0039008 | A1* | 2/2005 | Bhatia | G06F 21/33 713/170 |

(Continued)

FOREIGN PATENT DOCUMENTS

EP   2706763 A1   3/2014

OTHER PUBLICATIONS

International Search Report and Written Opinion from corresponding PCT Application No. PCT/US2015/066185, dated Mar. 24, 2016, 10 pages.

*Primary Examiner* — Moustapha Diaby
(74) *Attorney, Agent, or Firm* — Tong, Rea, Bentley & Kim, LLC (57) ABSTRACT

A capability for controlling access by a mobile device to venue-related items associated with a venue is presented. A server may be configured to detect a presence of the mobile device at the venue and send a venue token toward the mobile device based on detection of the presence of the mobile device at the venue, where the venue token includes an indication of a venue-related item that the mobile device is permitted to access independent of a location of the mobile device. A mobile device may be configured to receive a venue token based on a presence of the mobile device at the venue where the venue token includes an indication of a venue-related item that the mobile device is permitted to access independent of a location of the mobile device, and send a request for the venue-related item toward a server based on the venue token.

30 Claims, 4 Drawing Sheets

(56) References Cited

U.S. PATENT DOCUMENTS

| | | | |
|---|---|---|---|
| 2006/0026692 A1* | 2/2006 | Lakhani | G06F 21/31 726/28 |
| 2007/0186105 A1* | 8/2007 | Bailey | H04L 63/0492 713/168 |
| 2010/0080163 A1* | 4/2010 | Krishnamoorthi | H04L 12/189 370/312 |
| 2010/0250672 A1* | 9/2010 | Vance | G06Q 10/109 709/204 |
| 2011/0119743 A1* | 5/2011 | Gleim | H04L 63/0807 726/6 |
| 2011/0276797 A1* | 11/2011 | Pedlow | H04L 63/0807 713/151 |
| 2013/0060637 A1 | 3/2013 | Walker | |
| 2013/0132194 A1 | 5/2013 | Rajaram | |
| 2013/0198817 A1* | 8/2013 | Haddad | H04L 63/18 726/5 |
| 2013/0254027 A1 | 9/2013 | Silverman et al. | |
| 2014/0282967 A1* | 9/2014 | Maguire | H04W 36/18 726/7 |
| 2014/0282993 A1 | 9/2014 | Van Till | |

\* cited by examiner

CONTROLLING ACCESS TO VENUE-RELATED CONTENT, APPLICATIONS, AND SERVICES

TECHNICAL FIELD

The disclosure relates generally to communication networks and, more specifically but not exclusively, to use of communication networks to control access to venue-related content, applications, and services.

BACKGROUND

In general, various types of venues may serve as the locations for various types of events or activities. For example, stadiums may be venues for sporting events and concerts, parks may be venues for concerts and other gatherings, museums and libraries may be venues for various activities, and so forth. In certain venues, limited amounts of venue-related information may be shared with people present at the venue. For example, large screen displays at stadiums may be used by fans to watch replays of sporting events and provide different views of the stage at concerts. However, people visiting many types of venues, and attending certain types of events at such venues, are growing to expect greater amounts of information and interactivity related to the venues and the events taking place at the venues. This is particularly true for events which people also may access remotely, such as sporting events and other types of events which may be broadcast on television or accessed via the Internet, as people typically have access to such additional information via the Internet. Accordingly, in order to continue to attract people to such venues, promoters have an incentive to provide people at the venues with an enhanced experience related to presence at the venues. Disadvantageously, however, existing mechanisms for providing a person at a venue with an enhanced experience related to the presence of the person at the venue suffer from various drawbacks.

SUMMARY OF EMBODIMENTS

Various deficiencies in the prior art are addressed by embodiments for controlling access to venue-related items associated with a venue.

In at least some embodiments, an apparatus includes a processor and a memory communicatively connected to the processor, wherein the processor is configured to detect a presence of a mobile device at a venue and send a venue token toward the mobile device based on detection of the presence of the mobile device at the venue, where the venue token includes an indication of a venue-related item that the mobile device is permitted to access independent of a location of the mobile device.

In at least some embodiments, a method includes using a processor and a memory for detecting a presence of a mobile device at a venue, and sending a venue token toward the mobile device based on detection of the presence of the mobile device at the venue, where the venue token includes an indication of a venue-related item that the mobile device is permitted to access independent of a location of the mobile device.

In at least some embodiments, an apparatus includes a processor and a memory communicatively connected to the processor, wherein the processor is configured to receive a venue token based on a presence of the mobile device at a venue where the venue token includes an indication of a venue-related item that the mobile device is permitted to access independent of a location of the mobile device, and send a request for the venue-related item toward a server based on the venue token.

In at least some embodiments, a method includes using a processor and a memory for receiving a venue token based on a presence of the mobile device at a venue where the venue token includes an indication of a venue-related item that the mobile device is permitted to access independent of a location of the mobile device, and sending a request for the venue-related item toward a server based on the venue token.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A capability for controlling access to venue-related items (e.g., content, applications, services, or the like) is presented. The capability for controlling access to venue-related items may enable a person with a mobile device to access venue-related items independent of the location of the person (e.g., while still at the venue or after the person leaves the venue). The capability for controlling access to venue-related items may enable a person with a mobile device to access venue-related items served from inside of the venue or served from outside of the venue. The capability for controlling access to venue-related items may enable a person with a mobile device to access venue-related items by automatically providing to the mobile device a venue token which may be used by the mobile device to access venue-related items. The venue token may be provided automatically based on detection of a presence of the mobile device at the venue. The venue token may identify one or more venue-related items accessible via the mobile device based on the detection of the presence of the mobile device at the venue. The venue token may include authentication information (e.g., authentication credentials, an authentication function configured to generate authentication credentials, or the like, as well as various combinations thereof). The venue token may include context information associated with access to the one or more venue-related items identified in the venue token. The venue token may have various other characteristics configured therein or associated therewith. The capability for controlling access to venue-related items may enable a person with a mobile device to access venue-related items while obviating a need for acquiring or maintaining a registration of the person or the mobile device, which may be particularly useful for venues having a relatively large number of attendees. These and various other embodiments and advantages of the capability for controlling access to venue-related items may be better understood by way of reference to the exemplary chat-based system of FIG. 1.

Figure 1:
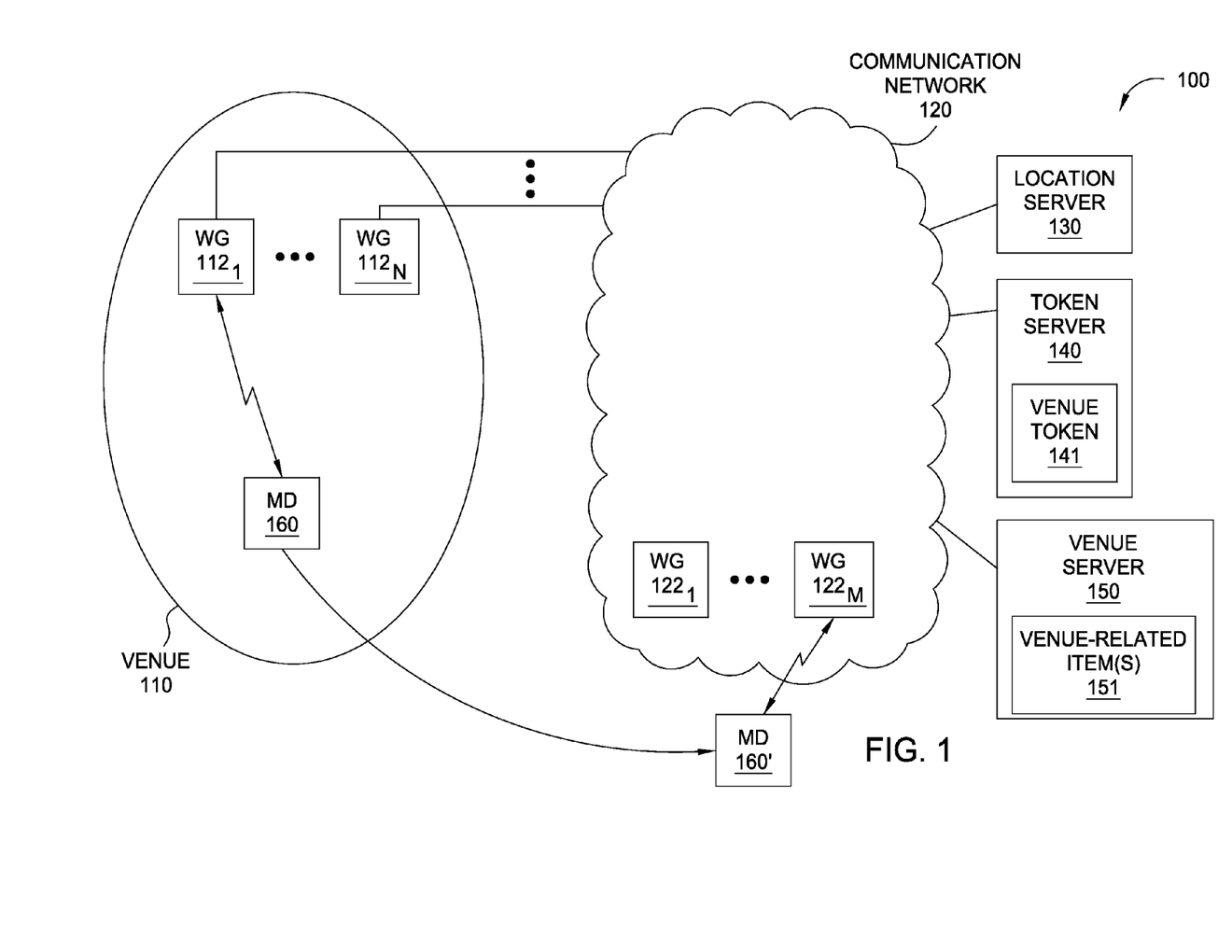
FIG. 1 depicts an exemplary environment for illustrating control over access to venue-related items associated with a venue.

FIG. 1 depicts an exemplary environment for illustrating control over access to venue-related items associated with a venue.

The environment 100 includes a venue 110, a communication network (CN) 120, a location server (LS) 130, a token server (TS) 140, a venue server (VS) 150, and a mobile device (MD) 160.

The venue 110 may be a place or a location at which an event or an activity takes place. The people attending the event or activity at the venue 110 generally need to be admitted to the venue 110 in order to become an authorized attendee of the event or activity. For example, venue 110 may be a stadium, a museum, a library, a theme park, a cruise ship, a convention center, a hotel, a casino, an outside location (e.g., a park, a parking lot, a lawn, or the like), or the like, as well as various combinations thereof. The venue 110 also may be considered to include locations outside of a building of the venue 110 (e.g., a stadium parking lot of a stadium, a museum parking lot of a museum, an outdoor recreational and pool area of a hotel, or the like), where access to the people attending the event or activity at the venue 110 generally also need to be admitted to such locations outside of the building of the venue 110. As such, the area of which venue 110 is composed (denoted by the oval labeled as venue 110), which is expected to be defined for purposes of detecting the presence of MD 160 at the venue 110, may be defined based on one or more geographic locations (e.g., a geographic area covering a stadium and its surrounding parking lot, a geographic area covering a college campus, or the like), one or more indoor locations (e.g., indoor locations within a museum, indoor locations within an office building, or the like), or the like, as well as various combinations thereof (e.g., a combination of indoor locations within a stadium and a geographic area covering the surrounding stadium parking lot of the stadium). The venue 110, or the event or activity taking place within the venue 110, may have associated therewith venue-related items (e.g., content items, applications, services, or the like, as well as various combinations thereof) which may be accessible from VS 150 (depicted as venue-related items 151), as discussed further hereinbelow.

The venue 110 includes a set of wireless gateways (WGs) $112_1$-$112_N$ (collectively, WGs 112). The WGs 112 are configured to support wireless communications of MD 160 while MD 160 is located at venue 110 (as well as other MDs which may be located at venue 110, which are omitted from FIG. 1 for purposes of clarity). The WGs 112 are communicatively connected to CN 120 and, thus, may support various types of communications for MD 160 (e.g., communications with LS 130 for enabling LS 130 to determine the location of MD 160, communications with TS 140 for enabling TS 140 to support automatic delivery of a venue token for venue 110 to MD 160, communications with VS 150 for supporting access by MD 160 to venue-related items 151 available from VS 150, voice and data communications normally performed via MD 160 independent of the venue 160, or the like, as well as various combinations thereof). For example, WGs 112 may include WiFi access points (WAPs), cellular access points (e.g., cellular base stations, picocells, femtocells, or the like), or the like, as well as various combinations thereof. It will be appreciated that, although primarily depicted and described with respect to embodiments in which WGs 112 of venue 110 are used to enable LS 130 to determine the location of MD 160, in at least some embodiments venue 110 also or alternatively may include other types of location tracking devices (e.g., signal detection devices or the like, which are omitted from FIG. 1 for purposes of clarity) in order to enable LS 130 to determine the location of MD 160.

The CN 120 is a communication network configured to support various types of communications discussed herein. The CN 120 is communicatively connected to WGs 112 of venue 110 (as discussed hereinabove with respect to venue 110) and is communicatively connected to LS 130, TS 140, and VS 150. The CN 120 may include a wireless access network portion (e.g., a set of wireless gateways (WGs) $122_1$-$122_M$ (collectively, WGs 122) as depicted in FIG. 1), a wireless core network portion, a wireline access network portion, a wireline core network portion, or the like, as well as various combinations thereof. It will be appreciated that the CN 120 may utilize various types of communications technologies, protocols, capabilities, and so forth. The WGs 122 of CN 120 are configured to support wireless communications of MD 160 while MD 160 is located away from venue 110 (as well as other MDs which may be located away from venue 110, which are omitted from FIG. 1 for purposes of clarity). The WGs 122 are configured to operate as wireless points of access to CN 120 and, accordingly, may support various types of communications for MD 160 (e.g., communications with LS 130 for enabling LS 130 to determine the location of MD 160, communications with TS 140 for enabling TS 140 to support automatic delivery of a venue token for venue 110 to MD 160, communications with VS 150 for supporting access by MD 160 to venue-related items 151 available from VS 150, voice and data communications normally performed via MD 160 independent of the venue 160, or the like, as well as various combinations thereof). For example, WGs 122 may include WiFi access points (WAPs), cellular access points (e.g., cellular base stations, picocells, femtocells, or the like), or the like, as well as various combinations thereof. It will be appreciated that, although primarily depicted and described with respect to embodiments in which WGs 122 of CN 120 are used to enable LS 130 to determine the location of MD 160, in at least some embodiments CN 120 also or alternatively may include other types of location tracking devices (e.g., signal detection devices or the like, which are omitted from FIG. 1 for purposes of clarity) in order to enable LS 130 to determine the location of MD 160. It will be appreciated that, while WGs 122 of CN 120 may support communications with LS 130 for enabling LS 130 to determine the location of MD 160 and may support communications with TS 140 for enabling TS 140 to support automatic delivery of a venue token for venue 110 to MD 160, such communications may not be performed where the venue token has already been provided to MD 160 and, thus, MD 160 is entitles to access venue-related items 151 from VS 150 independent of the current location of MD 160.

The LS 130 is configured to perform location detection functions. The LS 130 is configured to determine the location of MD 160 and to detect the presence of MD 160 at venue 110 based on the determined location of MD 160 and venue boundary definition information that defines the boundaries of venue 110. The LS 130 may determine the location of MD 160 based on various types of information which may be processed in various ways. For example, LS 130 may determine the location of MD 160 based on one or more of Global Positioning System (GPS) information associated with MD 160, time-difference-of-arrival information associated with MD 160 (e.g., received from three or more of the WGs 112 of venue 110 and used to triangulate the location of MD 160), presence detection information associated with MD 160 (e.g., received from one or more presence detection devices configured to detect the presence of MD 160 within a particular distance of the one or more presence detection devices), or the like, as well as various combinations thereof. The LS 130 may detect the presence of MD 160 at venue 110, based on the determined location of MD 160 and venue boundary definition information that defines the boundaries of venue 110, by comparing the determined location of MD 160 and the venue boundary definition information that defines the boundaries of venue 110 for determining whether the MD 160 is located within the boundaries of venue 110. It will be appreciated that, although primarily depicted and described with respect to embodiments in which LS 130 is configured to detect the presence of MD 160 at venue 110 based on the determined location of MD 160 and the venue boundary definition information that defines the boundaries of venue 110, in at least some embodiments LS 130 may be configured to detect the presence of MD 160 at venue 110 simply based on detection of the presence of MD 160 by one or more presence detection devices known to be located at the venue 110. The LS 130 is configured to notify TS 140 based on detection of the presence of MD 160 at venue 110.

The TS 140 is configured to provide a venue token 141 to MD 160 based on detection of the presence of MD 160 at venue 110.

The TS 140 may detect the presence of MD 160 at venue 110 based on receiving, from LS 130, a notification indicative that LS 130 has detected the presence of MD 160 at venue 110. The TS 140 may be configured to provide the venue token 141 to MD 160 responsive to a request for the venue token received from MD 160 (e.g., after the presence of MD 160 at venue 110 has been detected) or automatically without any request for the venue token 141 being received from MD 160 (e.g., automatically responsive to detection of the presence of MD 160 at venue 110, automatically responsive to some other trigger or condition after the presence of MD 160 at venue 110 has been detected, or the like).

The TS 140 may be configured to obtain the venue token 141 to be provided to MD 160. The TS 140 may be configured to obtain the venue token 141 by retrieving the venue token 141 (e.g., from a device remote from TS 140), generating the venue token 141 locally at TS 140, or the like, as well as various combinations thereof. The TS 140 may be configured to obtain the venue token 141 prior to detection of the presence of MD 160 at venue 110, dynamically responsive to detection of the presence of MD 160 at venue 110, partially prior to detection of the presence of MD 160 at venue 110 and partially dynamically responsive to detection of the presence of MD 160 at venue 110 (e.g., a generic venue token is obtained prior to detection of the presence of MD 160 at venue 110 and the generic venue token is then updated dynamically responsive to detection of the presence of MD 160 at venue 110 to form the venue token 141 that is provided by TS 140 to MD 160), or the like, as well as various combinations thereof.

The venue token 141 is configured to extend the venue-related experience of the user of MD 160 beyond the venue 110 by enabling the user of MD 160 to use the venue token 141 to access venue-related items 151 after the user leaves venue 110 (illustratively, from VS 150). The venue token 141 may be specific to MD 160, may be specific to a group of MDs including MD 160, may be a generic venue token to be provided to any MD (including MD 160 and any other MDs) detected as being present at venue 110, or the like. The venue token 141, or portions of venue token 141, may be used by MD 160 to access one or more venue-related items 151 after the user of MD 160 has left venue 110, thereby enabling an extension of the venue-related experience of the user of MD 160 beyond the venue 110.

The venue token 141 includes an indication of one or more venue-related items 151 that MD 160 is permitted to access. The indication of the one or more venue-related items 151 that MD 160 is permitted to access may be encoded within venue token 141. The manner in which the one or more venue-related items 151 that MD 160 is permitted to access are indicated in the venue token 141 may depend on various factors (e.g., the number of devices from which the venue-related items 151 are available, the type(s) of venue-related items 151, or the like, as well as various combinations thereof). The indication of a venue-related item 151 that MD 160 is permitted to access may be included within venue token 141 by including a Uniform Resource Identifier (URI) of the venue-related item 151 within the venue token 141. The indication of a venue-related item 151 that MD 160 is permitted to access may be included within venue token 141 by including a network address of a device (illustratively, VS 150, discussed further below) hosting the venue-related item 151 and file/item path information indicating a location of the venue-related item 151 on the device hosting the venue-related item 151. The indication of a venue-related item 151 that MD 160 is permitted to access may be included within venue token 141 in any other manner suitable for use by MD 160 to request access to the venue-related item 151. It is noted that the inclusion within the venue token 141 of the indication of the one or more venue-related items 151 that MD 160 is permitted to access obviates the need (e.g., by TS 140, VS 150, or any other related device or entity) to obtain and manage registration information for MD 160 (or any other MDs associated with venue 110 which, again, have been omitted from FIG. 1 for purposes of clarity), which significantly reduces the overhead associated with providing access to venue-related items 151 associated with venue 110. The indication of the one or more venue-related items 151 that MD 160 is permitted to access may be used by the MD 160 to request access to the one or more venue-related items 151.

The venue token 141 also may include authentication information. The inclusion of authentication information within the venue token 141 may be used to provide additional security for controlling access by MD 160 to the one or more venue-related items 151 indicated in the venue token 141. The authentication information may be used by the MD 160 to request access to the one or more venue-related items 151. The authentication information may include authentication credentials, an authentication function configured for use in generating authentication credentials, or the like, as well as various combinations thereof. The MD 160 may provide the authentication credentials to VS 150 when requesting access to the one or more venue-related items 151 indicated in the venue token 141, and the authentication credentials may be verified by VS 150 before MD 160 is provided access to the one or more venue-related items 151 indicated in the venue token 141. The authentication credentials may include a value, a code, a certificate, or any other suitable form of authentication credentials. The authentication function configured for use in generating authentication credentials may include a hash function (or other suitable type of function) that will be used by VS 150 to generate authentication credentials that VS 150 will compare with authentication credentials received from MD 160 when MD 160 requests access to the one or more venue-related items 151 indicated in the venue token 141. For example, the venue token 141 provided to the MD 160 may include an authentication code known by VS 150 to be a valid code, MD 160 may send the authentication code to VS 150 as part of a request to access one or more venue-related items 151 indicated in the venue token 141, and VS 150 may verify that the authentication code received from MD 160 is valid before providing MD 160 access to the one or more venue-related items 151 requested by MD 160. Similarly, for example, the venue token 141 provided to the MD 160 may include a hash function which may be used by MD 160 to generate a hash value that may be provided by MD 160 to VS 150 as part of a request to access one or more venue-related items 151 indicated in the venue token 141, and VS 150 may use the same hash function to generate a corresponding hash value and may verify that the hash value received from MD 160 and the hash value generated by VS 150 match before providing MD 160 access to the one or more venue-related items 151 requested by MD 160. It will be appreciated that, although primarily presented with respect to embodiments in which the authentication information for venue token 141 is provided to MD 160 along with the venue token 141 (e.g., within the venue token 141, within the same message as the venue token 141, or the like), in at least some embodiments the authentication information for venue token 141 may be provided to MD 160 separately from the venue token 141 (e.g., via different messages of the same communication path or communication session, via different communication paths or communication sessions, from different sources of such information, or the like, as well as various combinations thereof) in order to provide enhanced security (e.g., an unauthorized device or person which somehow obtains the venue token 141 may not be able to obtain the associated authentication information and, thus, would be prevented from accessing the one or more venue-related items 151 indicated in the venue token 141). The authentication information associated with venue token 141 may be generated by TS 140 and provided by TS 140 to VS 150 and MD 160 (such that VS 150 has access to the authentication credentials to be used by MD 160 to access the one or more venue-related items 151 indicated in the venue token 141), generated by VS 150 and provided by VS 150 to TS 140 for TS 140 to provide to MD 160 (again, such that VS 150 has access to the authentication credentials to be used by MD 160 to access the one or more venue-related items 151 indicated in the venue token 141), or the like, as well as various combinations thereof. The use of authentication information to control access by MD 160 to the one or more venue-related items 151 indicated in the venue token 141 may obviate the need for VS 150 (or any other related device) to obtain and manage registration information for MD 160 (or any other MDs associated with venue 110 which, again, have been omitted from FIG. 1 for purposes of clarity). The authentication information, as discussed above, may be used by the MD 160 to request access to the one or more venue-related items 151.

The venue token 141 also may include context information. The context information may be used to improve access by MD 160 to the one or more venue-related items 151 indicated in the venue token 141, thereby enabling improvements in extension of the venue-related experience of the user of MD 160 beyond the venue 110. The context information may include user context information associated with a user of MD 160 (e.g., age, gender, or the like), which may be obtained from MD 160, VS 150, or any other suitable source of such information (e.g., a Home Subscriber Server (HSS) or other similar server, a context server, or the like). The context information may include device context information associated with MD 160 (e.g., device type, device model, device battery status, or the like), which may be obtained from MD 160 or any other suitable source of such information (e.g., a Home Subscriber Server (HSS) or other similar server, a context server, or the like). The context information may include venue context information associated with venue 110 (e.g., context information for the venue 110 (e.g., identification of specific locations or activities available within venue 110), context information for an event or activity taking place at the venue 110 (e.g., identification of specific locations or activities available at the event being held in the venue 110), context information related to presence of MD 160 at venue 110 (e.g., a number of times the MD 160 has been detected at venue 110, identification of specific locations or places within the venue 110 visited by a user of the MD 160 while at the venue, temporal venue context information (e.g., a time at which the presence of MD 160 at venue 110 was first detected, a time at which the presence of MD 160 at venue 110 was last detected, a length of time spent at the venue 110, or the like), identification of specific activities or transactions performed by the user of MD 160 at the venue 110, or the like, as well as various combinations thereof), which may be obtained from MD 160, VS 150, or any other suitable source of such information. The context information may include any other suitable type of context information which may be included within venue token 141 for use in extending the venue-related experience of the user of MD 160 beyond the venue 110. The context information, like the indications of the one or more venue-related items 151 that MD 160 is permitted to access, may be included or encoded within venue token 141 in various ways. It will be appreciated that, although primarily presented with respect to embodiments in which the context information for venue token 141 is provided to MD 160 along with the venue token 141 (e.g., within the venue token 141, within the same message as the venue token 141, or the like), in at least some embodiments the context information for venue token 141 may be provided to MD 160 separately from the venue token 141 (e.g., via different messages of the same communication path or communication session, via different communication paths or communication sessions, from different sources of such information, or the like, as well as various combinations thereof) in order to provide enhanced security or enhanced capabilities. The context information may be used by the MD 160 to request access to the one or more venue-related items 151.

The venue token 141 also may have characteristics associated therewith. The characteristics may be configured to control use of venue token by MD 160 to access venue-related items 151 from VS 150. For example, the venue token 141 may be have a finite duration associated therewith, after which the MD 160 may no longer access venue-related items 151 from VS 150 based venue token 141. The venue token 141 may have various other types of characteristics associated therewith.

The venue token 141, although primarily depicted and described as including specific types of information (namely, an indication of one or more venue-related items 151 that MD 160 is permitted to access and, optionally, authentication information or context information) and having specific characteristics associated therewith (e.g., a finite duration or the like), may include various other types of information or have various other types of characteristics which may be used by MD 160 to extend the venue-related experience of the user of MD 160 beyond the venue 110.

The VS 150 may be configured to maintain and control access to venue-related items 151 associated with venue 110.

The VS 150 may be configured to maintain various venue-related items 151 associated with venue 110, such as one or more content items (e.g., text-based content, web pages, audio clips, video clips, multimedia clips, statistics, discount offers, coupons, upgrade offers, or the like, as well as various combinations thereof), one or more applications (e.g., learning applications, trivia quiz applications, gaming applications, social networking applications, e-commerce applications, or the like), one or more services (e.g., virtual experience services, point of view services, content management services, social networking services, or the like), or the like, as well as various combinations thereof.

The VS 150 may be configured to support various types of access by MD 160 to venue-related items 151 associated with venue 110. The VS 150 may be configured to support access by MD 160 to at least some venue-related items 151 associated with venue 110, while MD 160 is located at venue 110, with or without use of the venue token by MD 160. The VS 150 may be configured to support access by MD 160 to at least some venue-related items 151 associated with venue 110, while MD 160 is not located at venue 110 (illustratively, MD 160' which has left venue 110), based on the venue token provided to MD 160. The VS 150 may be configured to receive a venue item request from MD 160 based on venue token 141 (e.g., the venue item request includes venue token 141, the venue item request includes information from venue token 141, or the like) and to provide one or more venue-related items 151 to MD 160 responsive to the venue item request. For example, VS 150 may receive a venue item request from MD 160 that includes venue token 141, and may provide MD 160 access to each of the one or more venue-related items 151 indicated by the venue token 141. For example, VS 150 may receive a venue item request from MD 160 that includes an identification of a venue-related item 151 being requested by MD 160 (e.g., a URI of the venue-related item 151 being requested by MD 160), and may provide the indicated venue-related item 151 to MD 160. For example, VS 150 may receive a venue item request from MD 160 that includes an identification of a venue-related item 151 being requested by MD 160 (e.g., a URI of the venue-related item 151 being requested by MD 160) and authentication credentials, and may provide the indicated venue-related item 151 to MD 160 after successful verification of the authentication credentials. For example, VS 150 may receive a venue item request from MD 160 that includes an identification of a venue-related item 151 being requested by MD 160 (e.g., a URI of the venue-related item 151 being requested by MD 160) and context information, and may provide the indicated venue-related item 151 to MD 160 based on the context information. For example, VS 150 may receive a venue item request from MD 160 that includes an identification of a venue-related item 151 being requested by MD 160 (e.g., a URI of the venue-related item 151 being requested by MD 160), authentication credentials, and context information, and may provide the indicated venue-related item 151 to MD 160 based on the context information after successful verification of the authentication credentials. It will be appreciated that requests by MD 160 for access to venue-related items 151 available from VS 150 may be provided by MD 160 in other ways and, thus, may be processed by VS 150 in other ways. It is noted that context information included by MD 160 in a venue item request may include one or more of context information from the venue token 141, context information obtained by MD 160 independent of venue token 141, or the like, as well as various combinations thereof.

The MD 160 is configured to access and use venue-related items 151 associated with venue 110 that are maintained by VS 150. As previously discussed, the MD 160 is initially located at the venue 110 (denoted by MD 160) and later moves to a location away from venue 110 (denoted by MD 160'). The location of MD 160 at the venue 110 is detected by LS 130 based on information received by LS 130 from one or more of the WGs 112, and the location of MD 160 away from the venue 110 may be detected by LS 130 based on information received by LS 130 from one or more of the WGs 122. The MD 160 may access venue-related items 151 associated with venue 110, from VS 150, while MD 160 is located at venue 110. The MD 160 receives the venue token 141 from TS 140 and stores the venue token 141 for use in accessing venue-related items 151 associated with venue 110 from VS 150. The MD 160 may use venue token 141 to access venue-related items 151 associated with venue 110, from VS 150, while MD 160 is located at venue 110 or while MD 160 is located away from venue 110 (i.e., independent of the location of MD 160). The MD 160 may use venue token 141 to request access to one or more venue-related items 151 associated with venue 110. The MD 160 may use venue token 141 to send a request for access to one or more venue-related items 151 associated with venue 110. The MD 160 may send a request for one or more venue-related items 151 associated with venue 110 to VS 150 based on venue token 141 (e.g., based on an indication of a venue-related item 151 that the mobile device is permitted to access independent of a location of the mobile device and, optionally, based on one or more other types of information which may be included within venue token 141 or otherwise determined by MD 160 (e.g., authentication credentials, context information, or the like)). For example, MD 160 may send a venue item request that includes venue token 141, and VS 150 may provide MD 160 access to each of the one or more venue-related items 151 indicated by the venue token 141. For example, MD 160 may send a venue item request that includes an identification of a venue-related item 151 being requested by MD 160 (e.g., a URI of the venue-related item 151 being requested by MD 160), and VS 150 may provide the indicated venue-related item 151 to MD 160. For example, MD 160 may send a venue item request that includes an identification of a venue-related item 151 being requested by MD 160 (e.g., a URI of the venue-related item 151 being requested by MD 160) and authentication credentials, and VS 150 may provide the indicated venue-related item 151 to MD 160 after successful verification of the authentication credentials. For example, MD 160 may send a venue item request that includes an identification of a venue-related item 151 being requested by MD 160 (e.g., a URI of the venue-related item 151 being requested by MD 160) and context information, and VS 150 may provide the indicated venue-related item 151 to MD 160 based on the context information. For example, MD 160 may send a venue item request that includes an identification of a venue-related item 151 being requested by MD 160 (e.g., a URI of the venue-related item 151 being requested by MD 160), authentication credentials, and context information, and VS 150 may provide the indicated venue-related item 151 to MD 160 based on the context information after successful verification of the authentication credentials. It is noted that context information included by MD 160 in a venue item request may include one or more of context information from the venue token 141, context information available to or obtained by MD 160 independent of venue token 141 (e.g., user context information stored on MD 160, device context information for MD 160 which may be available from one or more modules running on MD 160, or the like, as well as various combinations thereof), or the like, as well as various combinations thereof. It will be appreciated that sending of the venue item request by MD 160 may be preceded by generation of the venue item request by MD 160 or to include generation of the venue item request by MD 160 (e.g., where sending of the venue item request by MD 160 includes generation and transmission of the venue item request). It will be appreciated that requests by MD 160 for access to venue-related items 151 available from VS 150 may be provided by MD 160 in other ways and, thus, may be processed by VS 150 in other ways. The MD 160 may be a smartphone, a tablet computer, a laptop computer, or the like.

As discussed herein, VS 150 may maintain and control access to venue-related items 151 associated with venue 110, and MD 160 may access venue-related items 151 associated with venue 110 from VS 150 based on venue token 141 from TS 140. The types of venue-related items 151 associated with venue 110 which may be maintained and controlled by VS 150 and accessed by MD 160 may be better understood with respect to more specific examples. For example, a person that leaves a sporting event early may be allowed to participate in on-line contests and activities that revolve around the game (e.g., trivia quizzes, socially network with fans at the game, or the like), watch the remainder of the game online, receive real-time video feeds from various perspectives on the field (e.g., 50 yard line, bench views, or the like), receive real-time audio commentary regarding the game, access interesting statistics associated with the game, receive promotions (e.g., merchandise, future events at the venue of the sporting event, or the like), access location context-aware offers from merchants in the vicinity of the venue of the sporting event, or the like, as well as various combinations thereof. For example, a person that leaves a shopping mall may participate in a contest to receive a gift certificate to a store at the shopping mall, receive context-relevant offers (e.g., based on online shopping experience, based on context related to the current or past visits by the person to the shopping mall (e.g., which stores at the mall were visited by the person, past purchases by the person, frequency of visits to the shopping mall or to specific stores within the shopping mall, or the like), based on various other types of context information, or the like, as well as various combinations thereof). For example, a person that leaves a first-class airport lounge may be provided with walking directions from the first-class airport lounge to the departure gate, video clips of reference points located between the lounge and the departure gate, offers from merchants located between the lounge and the departure gate, or the like, as well as various combinations thereof. For example, a person that leaves a university lecture may be provided with a discount to purchase a book on the lecture subject, provided access to related resource materials after for a period of time after leaving the lecture hall, or the like. For example, a person at a corporate event may be provided access to attend an online small-group session with senior management. For example, a participant at an event may be provided access to a 2-1 discount offer, a free seat upgrade for a next event held at the venue, or the like. For example, an incoming college freshman at a college orientation event may be provided access to a follow-up virtual experience (e.g., social networking with other students, access to video archives from the day, or the like). For example, a visitor to a restaurant may receive a special discount after visiting the restaurant location on five consecutive days at lunch time. For example, a visitor to a sporting venue may be provided access to special seating after ten visits to the sporting venue. It will be appreciated that the foregoing examples are merely a few examples of the various types of venue-related items 151 associated with venue 110 which may be controlled by VS 150 and accessed by MD 160.

It will be appreciated that, although primarily presented with respect to embodiments in which LS 130, TS 140, and VS 150 have been arranged in a particular manner (illustratively, implemented as separate devices deployed at particular network locations relative to each other and other elements), LS 130, TS 140, and VS 150 may be arranged in various other ways. In at least some embodiments, for example, LS 130, TS 140, and VS 150 may be implemented in other ways (e.g., a combined server providing the functions of LS 130 and TS 140, a combined server providing the functions of TS 140 and VS 150, a combined server providing the functions of LS 130, TS 140, and VS 150, multiple servers providing the functions of VS 150, or the like, as well as various combinations thereof). In at least some embodiments, for example, one or more of LS 130, TS 140, or VS 150 may be deployed in other ways (e.g., deployment of VS 150 within venue 110 such that it is communicatively connected to network infrastructure of venue 110).

Figure 2:
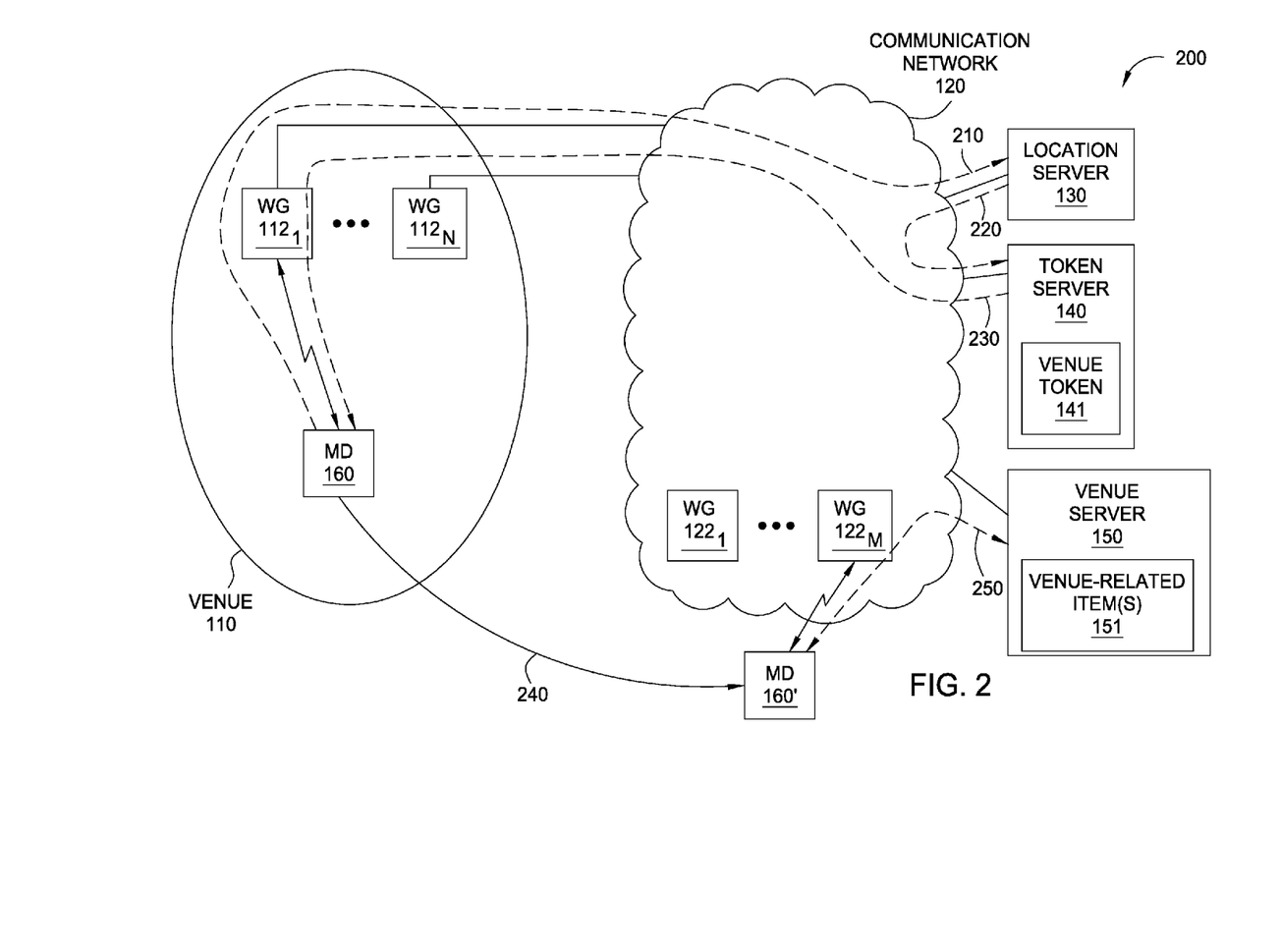
FIG. 2 depicts an exemplary embodiment of a method for controlling access to venue-related items associated with the venue of FIG. 1.

FIG. 2 depicts an exemplary embodiment of a method for controlling access to venue-related items associated with the venue of FIG. 1. More specifically, as depicted in FIG. 2, method 200 is presented within the context of environment 100 of FIG. 1. The operation of method 200 may be further understood when read in conjunction with the description of environment 100 of FIG. 1. The method 200 may begin at any suitable time after MD 160 enters venue 110 (e.g., upon detection of the MD 160 at the venue 110, responsive to downloading of a venue application by MD 160, or the like). At step 210, LS 130 detects the presence of MD 160 at venue 110. At step 220, LS 130 informs TS 140 of detection of presence of MD 160 at venue 110. At step 230, TS 140 provides a venue token to MD 160 based on detection of the presence of MD 160 at venue 110. The operation of TS 140 within the context of FIG. 2 may be further understood by way of reference to FIG. 3. At step 240, MD 160 moves from being located at venue 110 to being located remote from venue 110. At step 250, MD 160 uses the venue token to access venue-related items 151 from VS 150. The MD 160 may send a request for a venue-related item 151 toward the VS 150 and receive the venue-related item 151 from VS 150. The request for the venue-related item 151 may include the venue token or may include a portion of the venue token (e.g., an indication of the venue-related item 151 that is being requested, authentication credentials which may be verified by VS 150 prior to providing the requested venue-related item 151 to MD 160, context information, or the like, as well as various combinations thereof). The operation of MD 160 within the context of FIG. 2 may be further understood by way of reference to FIG. 4. In this manner, a virtual experience is extended to the user of MD 160 after the user of MD 160 leaves venue 110. The method 200 may end at any suitable time after MD 160 receives the venue token for venue 110 (e.g., upon a determination that the venue token has expired, responsive to deletion of a venue application from MD 160, or the like).

Figure 3:
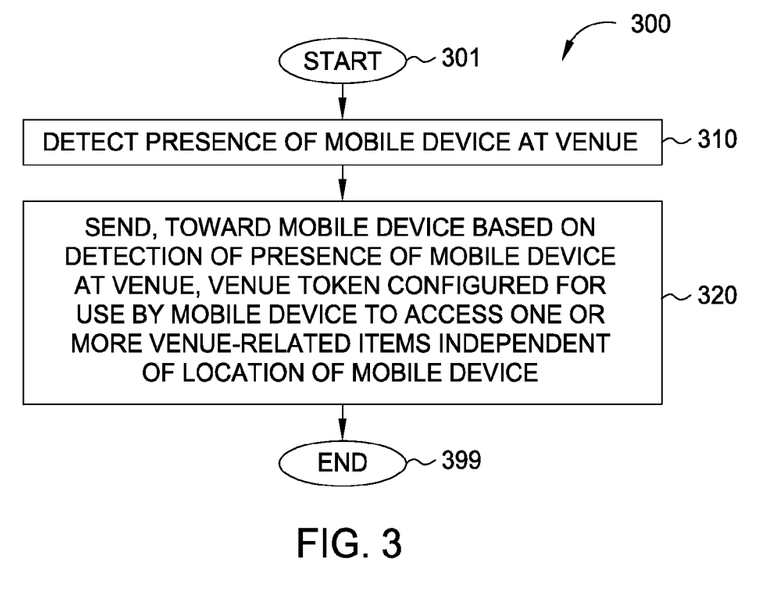
FIG. 3 depicts an exemplary embodiment of a method performed by a token server for providing a venue token to a mobile device.

FIG. 3 depicts an exemplary embodiment of a method performed by a token server for providing a venue token to a mobile device. For example, method 300 of FIG. 3 may be performed by TS 140 of FIG. 1. At step 301, method 300 begins. At step 310, the presence of the mobile device at the venue is detected. At step 320, a venue token is sent toward the mobile device based on detection of the presence of the mobile device at the venue. At step 399, method 300 ends. The operation of method 300 may be further understood when read in conjunction with FIG. 1 and FIG. 2.

Figure 4:
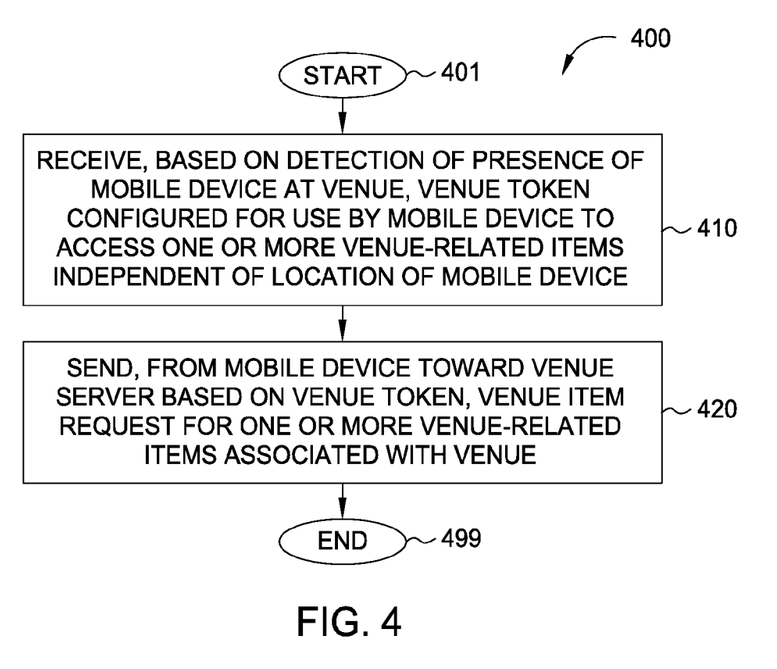
FIG. 4 depicts an exemplary embodiment of a method performed by a mobile device accessing venue-related items based on a venue token received from a token server.

FIG. 4 depicts an exemplary embodiment of a method performed by a mobile device accessing venue-related items based on a venue token received from a token server. For example, method 400 of FIG. 4 may be performed by MD 160 of FIG. 1. At step 401, method 400 begins. At step 410, the mobile device receives, based on a presence of the mobile device at the venue, a venue token configured for use by the mobile device to access one or more venue-related items independent of a location of the mobile device. At step 420, the mobile device sends, toward a venue server based on the venue token, a venue item request for one or more venue-related items associated with the venue. At step 499, method 400 ends. The operation of method 400 may be further understood when read in conjunction with FIG. 1 and FIG. 2.

It will be appreciated that, although primarily presented with respect to embodiments in which the venue token is provided to the mobile device of the user and used by the mobile device of the user to access the one or more venue-related items, in at least some embodiments the venue token may be moved or copied from the mobile device of the user to one or more other end devices (e.g., of the user or of any other authorized user) and used by the one or more other end devices to access the one or more venue-related items. The venue token may be moved or copied from the mobile device of the user to one or more other end devices responsive to a manual command initiated by the user, automatically responsive to detection of a trigger condition, or the like. The venue token may be moved or copied from the mobile device of the user to one or more other end devices using one or more messages, using any suitable communication protocols, or the like, as well as various combinations thereof. The end device(s) to which the venue token may be sent may include a computer (e.g., a tablet computer, a laptop computer, a desktop computer, or the like), a television, a gaming console, or the like. For example, the user may manually initiate transfer of the token from his or her mobile device to a laptop computer and then use the laptop computer to access the one or more venue-related items. For example, the mobile device of the user may automatically transfer the token from the mobile device to a desktop computer or television based on a trigger condition (e.g., detection of a home network of the user, detection of a work network of the user, detection of a WiFi access point that the mobile device is configured to access automatically, detection of a geographic location of the mobile device, or the like, as well as various combinations thereof).

Figure 5:
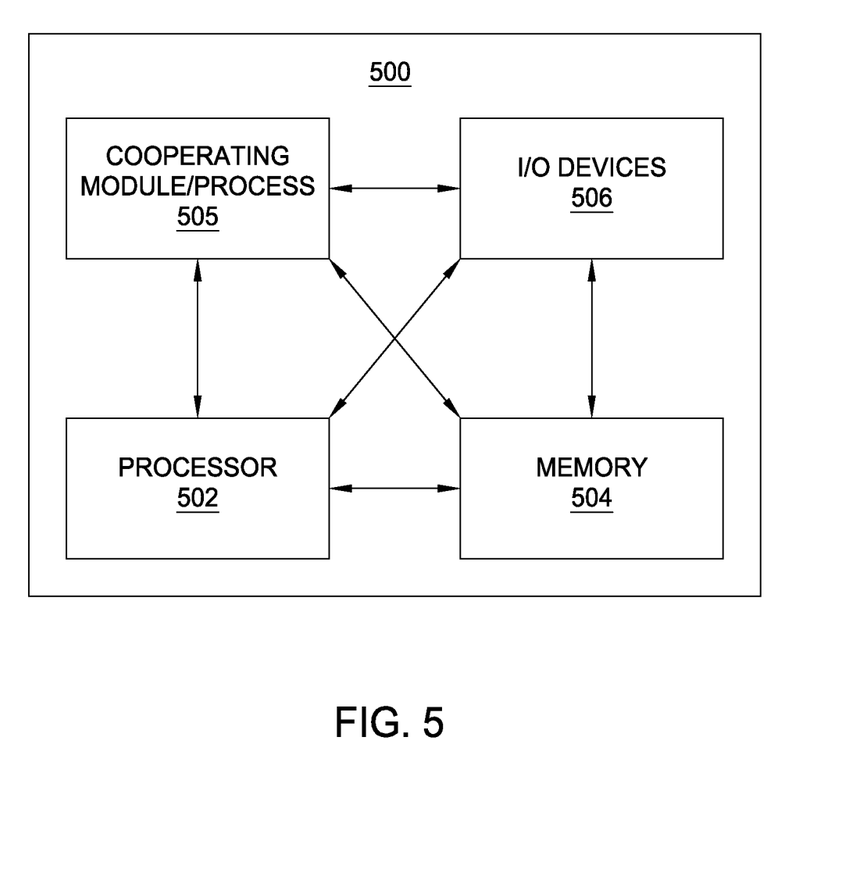
FIG. 5 depicts a high-level block diagram of a computer suitable for use in performing functions presented herein.

FIG. 5 depicts a high-level block diagram of a computer suitable for use in performing functions described herein.

The computer 500 includes a processor 502 (e.g., a central processing unit (CPU) and/or other suitable processor(s)) and a memory 504 (e.g., random access memory (RAM), read only memory (ROM), and the like).

The computer 500 also may include a cooperating module/process 505. The cooperating process 505 can be loaded into memory 504 and executed by the processor 502 to implement functions as discussed herein and, thus, cooperating process 505 (including associated data structures) can be stored on a computer-readable storage medium, e.g., RAM, magnetic or optical drive or diskette, and the like.

The computer 500 also may include one or more input/output devices 506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 500 depicted in FIG. 5 provides a general architecture and functionality suitable for implementing functional elements described herein and/or portions of functional elements described herein. For example, computer 500 provides a general architecture and functionality suitable for implementing one or more of one of the WGs 112, one of the WGs 122, LS 130, TS 140, VS 150, MD 160, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    a processor and a memory communicatively connected to the processor, the processor configured to:
        detect a presence of a mobile device at a venue;
        send, toward the mobile device based on detection of the presence of the mobile device at the venue, a venue token comprising an indication of a venue-related item that the mobile device is permitted to access independent of a location of the mobile device; and
        send, toward the mobile device based on detection of the presence of the mobile device at the venue and separately from the sending of the venue token toward the mobile device, authentication information associated with the venue token.

2. The apparatus of claim 1, wherein the processor is configured to detect the presence of the mobile device at the venue based on receipt of a message from a location server.

3. The apparatus of claim 1, wherein the processor is configured to send the venue token automatically based on detection of the presence of the mobile device at the venue.

4. The apparatus of claim 1, wherein the indication of the venue-related item that the mobile device is permitted to access independent of the location of the mobile device is encoded within the venue token.

5. The apparatus of claim 1, wherein the indication of the venue-related item that the mobile device is permitted to access independent of the location of the mobile device comprises a Uniform Resource Identifier (URI) of the venue-related item.

6. The apparatus of claim 1, wherein the processor is configured to send the venue token via a first communication session and to send the authentication information via a second communication session.

7. The apparatus of claim 1, wherein the authentication information comprises authentication credentials.

8. The apparatus of claim 7, wherein the authentication credentials comprise at least one of a value, a code, or a certificate.

9. The apparatus of claim 1, wherein the authentication information comprises an authentication function configured for generating authentication credentials.

10. The apparatus of claim 1, wherein the processor is configured to:
generate the authentication information and send the authentication information toward a venue server; or
receive the authentication information from a venue server.

11. The apparatus of claim 1, wherein the venue token further comprises an indication of context information.

12. The apparatus of claim 1, wherein the venue-related item comprises at least one of a content item, an application, or a service.

13. The apparatus of claim 1, wherein the authentication information is configured for controlling access by the mobile device to the venue-related item indicated in the venue token.

14. A method, comprising:
detecting, by a processor, a presence of a mobile device at a venue;
sending, toward the mobile device based on detection of the presence of the mobile device at the venue, a venue token comprising an indication of a venue-related item that the mobile device is permitted to access independent of a location of the mobile device; and
sending, based on detection of the presence of the mobile device at the venue and separately from the sending of the venue token toward the mobile device, authentication information associated with the venue token.

15. A mobile device, comprising:
a processor and a memory communicatively connected to the processor, the processor configured to:
receive, at the mobile device based on a presence of the mobile device at a venue, a venue token comprising an indication of a venue-related item that the mobile device is permitted to access independent of a location of the mobile device;
receive, at the mobile device based on the presence of the mobile device at the venue and separately from the receiving of the venue token at the mobile device, authentication information associated with the venue token;
generate, at the mobile device, based on the venue token and the authentication information, a request for the venue-related item; and
send the request for the venue-related item from the mobile device toward a server.

16. The mobile device of claim 15, wherein the indication of the venue-related item that the mobile device is permitted to access independent of the location of the mobile device is encoded within the venue token.

17. The mobile device of claim 15, wherein the indication of the venue-related item that the mobile device is permitted to access independent of the location of the mobile device comprises a Uniform Resource Identifier (URI) of the venue-related item.

18. The mobile device of claim 15, wherein the processor is configured to receive the venue token via a first communication session and to receive the authentication information via a second communication session.

19. The mobile device of claim 15, wherein the authentication information comprises authentication credentials.

20. The mobile device of claim 19, wherein the authentication credentials comprise at least one of a value, a code, or a certificate.

21. The mobile device of claim 15, wherein the processor is configured to:
receive the authentication information from the server or from a token server from which the venue token is received.

22. The mobile device of claim 15, wherein the authentication information comprises an authentication function configured for generating authentication credentials.

23. The mobile device of claim 22, wherein the processor is configured to:
generate authentication credentials based on the authentication function; and
generate the request for the venue-related item based on the authentication credentials.

24. The mobile device of claim 15, wherein the venue token further comprises an indication of context information.

25. The mobile device of claim 24, wherein the processor is configured to send the request for the venue-related item based on the context information.

26. The mobile device of claim 15, wherein the venue token is valid for a finite duration.

27. The mobile device of claim 15, wherein the processor is configured to:
send the venue token toward an end device responsive to a trigger condition.

28. The mobile device of claim 15, wherein the venue-related item comprises at least one of a content item, an application, or a service.

29. The mobile device of claim 15, wherein the authentication information is configured for controlling access by the mobile device to the venue-related item indicated in the venue token.

30. A method, comprising:
receiving, by a processor at a mobile device based on a presence of the mobile device at a venue, a venue token comprising an indication of a venue-related item that the mobile device is permitted to access independent of a location of the mobile device;
receiving, at the mobile device based on the presence of the mobile device at the venue and separately from the receiving of the venue token at the mobile device, authentication information associated with the venue token;

generating, at the mobile device, based on the venue token and the authentication information, a request for the venue-related item; and sending the request for the venue-related item from the mobile device toward a server.

\* \* \* \* \*